United States Patent
Ding

(10) Patent No.: US 9,367,296 B2
(45) Date of Patent: Jun. 14, 2016

(54) METHOD AND SYSTEM FOR SYNCHRONIZING APPLICATION PROGRAMS ACROSS DEVICES

(75) Inventor: Yang Ding, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 155 days.

(21) Appl. No.: 14/004,903

(22) PCT Filed: Jun. 21, 2012

(86) PCT No.: PCT/CN2012/077279
§ 371 (c)(1),
(2), (4) Date: Sep. 12, 2013

(87) PCT Pub. No.: WO2013/004129
PCT Pub. Date: Jan. 10, 2013

(65) Prior Publication Data
US 2014/0007084 A1   Jan. 2, 2014

(30) Foreign Application Priority Data
Jul. 6, 2011 (CN) .......................... 2011 1 0188393

(51) Int. Cl.
G06F 9/445 (2006.01)
H04L 29/08 (2006.01)
(52) U.S. Cl.
CPC .. *G06F 8/61* (2013.01); *H04L 67/34* (2013.01)
(58) Field of Classification Search
CPC .................................. G06F 8/61; H04L 67/34
See application file for complete search history.

(56) References Cited

U.S. PATENT DOCUMENTS 5,742,829 A * 4/1998 Davis ........................ G06F 8/61
717/178
5,933,647 A * 8/1999 Aronberg et al. ............. 717/178
(Continued)

FOREIGN PATENT DOCUMENTS

| CN | 101119517 A | 2/2008 |
| CN | 101336423 A | 12/2008 |
| CN | 102262552 A | 11/2011 |

OTHER PUBLICATIONS

Guruduth Banavar et al., "Challenges: An Application Model for Pervasive Computing", [Online], 2000, pp. 1-9, [Retrieved from Internet on Apr. 27, 2016], <http://delivery.acm.org/10.1145/350000/345957/p266-banavar.pdf>.*
(Continued)

*Primary Examiner* — Thuy Dao
*Assistant Examiner* — Ziaul A Chowdhury
(74) *Attorney, Agent, or Firm* — Cheng-Ju Chiang

(57) ABSTRACT

The present disclosure discloses a method for synchronizing application programs across devices. The method comprises the following steps: collecting and sending information of application programs installed in a first device to a server by a first client end; collecting and sending device information of a second device to the server by a second client end; sending download addresses of the application programs compatible with the second device to the second client end according to the device information received from the second client end and the information of the application programs received from the first client end by the server; downloading and installing the application programs in the second device according to the download addresses by the second client end. The present disclosure also provides a system for synchronizing the application programs across the devices.

4 Claims, 3 Drawing Sheets

(56) References Cited

U.S. PATENT DOCUMENTS

| | | | | |
|---|---|---|---|---|
| 6,615,405 | B1* | 9/2003 | Goldman et al. | 717/174 |
| 6,804,773 | B1* | 10/2004 | Grigsby | H04L 67/34 709/201 |
| 7,779,405 | B2* | 8/2010 | Gorti | G06F 8/61 717/172 |
| 7,885,925 | B1* | 2/2011 | Strong et al. | 707/620 |
| 8,341,249 | B2* | 12/2012 | Rakowski | H04L 41/0803 709/217 |
| 8,473,749 | B1* | 6/2013 | Madsen | H04L 67/34 713/187 |
| 2005/0154604 | A1* | 7/2005 | Ambrose | G06F 8/61 358/1.16 |
| 2006/0048141 | A1* | 3/2006 | Persson et al. | 717/176 |
| 2006/0230104 | A1* | 10/2006 | Winter | H04L 67/34 709/203 |
| 2008/0091808 | A1* | 4/2008 | Mei et al. | 709/223 |
| 2010/0312817 | A1* | 12/2010 | Steakley | 709/202 |
| 2011/0067023 | A1* | 3/2011 | Chiyo et al. | 717/177 |
| 2011/0072089 | A1* | 3/2011 | Broman | H04L 67/34 709/206 |
| 2011/0258301 | A1* | 10/2011 | McCormick | H04L 67/34 709/222 |
| 2012/0089668 | A1* | 4/2012 | Berg | H04J 3/0667 709/203 |
| 2013/0204925 | A1* | 8/2013 | McDougall | H04L 67/2804 709/203 |

OTHER PUBLICATIONS

Russell M. Taylor II et al., "VRPN: A Device-Independent, Network-Transparent VR Peripheral System", [Online], ACM 2001, pp. 1-7, [Retrieved from Internet on Apr. 27, 2016], <http://www.cs.unc.edu/~seeger/publications/2001taylor_vrpn.pdf>.*

Tobin J. Lehman et al., "Hitting the distributed computing sweet spot with TSpaces", [Online], 2001, pp. 457-472, [Retrie4ved from Internet on Apr. 27, 2016], <http://www.almaden.ibm.com/cs/tspaces/papers/ComputerNetworks.pdf>.*

Ian Foster et al., "Cloud Computing and Grid Computing 360-Degree Compared", [Online], IEEE 2008, pp. 1-10, [Retrieved from Internet on Apr. 27, 2016], <http://ieeexplore.ieee.org/stamp/stamp.jsp?tp=&arnumber=4738445>.*

* cited by examiner

METHOD AND SYSTEM FOR SYNCHRONIZING APPLICATION PROGRAMS ACROSS DEVICES

CROSS REFERENCE TO RELATED APPLICATIONS

The present application is a 35 U.S.C. §371 National Phase conversion of International (PCT) Patent Application No. PCT/CN2012/077279, filed on Jun. 21, 2012, the disclosure of which is incorporated by reference herein. The PCT International Patent Application was filed and published in Chinese.

FIELD OF THE INVENTION

The present disclosure relates to the field of computers and communications, particularly to a method and system for synchronizing application programs across devices.

BACKGROUND OF THE INVENTION

Along with the rapid development and upgrading of Internet devices, more and more kinds of Internet devices can be used by users in daily life, such as personal computers, personal digital assistants and smart phones. People simultaneously possess multiple devices or outfit with up-to-date devices more and more frequently, and application programs specific to the Internet devices also emerge in endlessly. On account of the cross-device transfer of the application programs, a conventional method is mainly to re-search these application programs and download and install these application programs to the up-to-date devices, which is very time-consuming and miscellaneous; or installation programs of old devices are directly copied to the up-to-date devices for being installed, and when the method is adopted, if the installation programs of the old devices are not compatible with the up-to-date devices, the installation programs may not be installed for use.

How to more efficiently transfer application programs which have been downloaded and installed in one Internet device to the other Internet device becomes one problem to be solved at present.

SUMMARY OF THE INVENTION

The present disclosure mainly solves the technical problem that application programs cannot be synchronized among a plurality of devices, and provides a method and system for synchronizing the application programs across the devices, in order to solve the problem that the conventional method for synchronizing the application programs across the devices is time-consuming and miscellaneous.

To solve the abovementioned technical problem, one technical solution adopted by the present disclosure is to provide a method for synchronizing application programs across devices. The method for synchronizing application programs across devices comprises the following steps of: installing a first client end in a first device, logging the first client end in a server through an account, and collecting and sending information of application programs installed in the first device to the server by the first client end; associating the information of the application programs received from the first client end with the account by the server; installing a second client end in a second device, logging the second client end in the server through the same account, and collecting and sending device information of the second device to the server by the second client end; sending download addresses of the application programs compatible with the second device to the second client end according to the device information received from the second client end and the information of the application programs under the account by the server; downloading and installing the application programs in the second device according to the download addresses by the second client end.

Preferably, the step of sending download addresses of the application programs compatible with the second device to the second client end according to the device information received from the second client end and the information of the application programs under the account by the server comprises: searching the information of the application programs compatible with the second device under the account according to the received device information, and sending the download addresses of the application programs compatible with the second device to the second client end by the server.

Preferably, the information of the application programs comprises software names, software types, software versions, application scenes or application fields.

Preferably, the device information comprises mainboard parameters, internal memory parameters, display card parameters, CPU (Central Processing Unit) parameters or operating system environment.

To solve the abovementioned technical problem, another technical solution adopted by the present disclosure is to provide a method for synchronizing application programs across devices. The method for synchronizing application programs across device comprises the following steps of: collecting and sending information of application programs installed in a first device to a server by a first client end; collecting and sending device information of a second device to the server by a second client end; sending download addresses of the application programs compatible with the second device to the second client end according to the device information received from the second client end and the information of the application programs received from the first client end by the server; downloading and installing the application programs in the second device according to the download addresses by the second client end.

Preferably, before the step of collecting and sending information of application programs installed in a first device to a server by a first client end, the method further comprises the following step of: logging the first client end in the server through an account.

Preferably, after the step of collecting and sending information of application programs installed in a first device to a server by a first client end, the method further comprises the following step of: associating the received information of the application programs with the account by the server.

Preferably, before the step of collecting and sending device information of a second device to the server by a second client end, the method further comprises the following step of: logging the second client end in the server through the same account.

Preferably, the step of sending download addresses of the application programs compatible with the second device to the second client end according to the device information received from the second client end and the information of the application programs received from the first client end by the server comprises: searching the information of the application programs compatible with the second device under the account according to the received device information, and sending the download addresses of the application programs compatible with the second device to the second client end by the server.

Preferably, the information of the application programs comprises software names, software types, software versions, application scenes or application fields.

Preferably, the device information comprises mainboard parameters, internal memory parameters, display card parameters, CPU parameters or operating system environment.

To solve the abovementioned technical problem, yet another technical solution adopted by the present disclosure is to provide a system for synchronizing application programs across devices. The system for synchronizing application programs across devices comprises a first client end, a second client end and a server. The first client end is configured to collect and send information of application programs installed in a first device to the server. The second client end is configured to collect and send device information of a second device to the server. The server is configured to send download addresses of the application programs compatible with the second device to the second client end according to the device information received from the second client end and the information of the application programs received from the first client end. The second client end is further configured to download and install the application programs in the second device according to the download addresses.

Preferably, the first client end is further configured to log in the server through an account.

Preferably, the server is further configured to associate the received information of the application programs with the account.

Preferably, the second client end is further configured to log in the server through the same account.

Preferably, the server is further configured to search the information of the application programs compatible with the second device according to the device information, and send the download addresses of the application programs compatible with the second device to the second client end.

Preferably, the information of the application programs comprises software names, software types, software versions, application scenes or application fields.

Preferably, the device information comprises mainboard parameters, internal memory parameters, display card parameters, CPU parameters or operating system environment.

The method and system for synchronizing application programs across devices of the present disclosure are capable of conveniently and rapidly realizing the synchronization of the application programs among various devices to ensure that a user can rapidly and effectively install the application programs compatible with up-to-date devices, which have been installed in old devices.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts. In the attached drawings.

DETAILED DESCRIPTION OF THE INVENTION

The present disclosure is described in detail by combining the drawings with the embodiments as follows.

Figure 1:
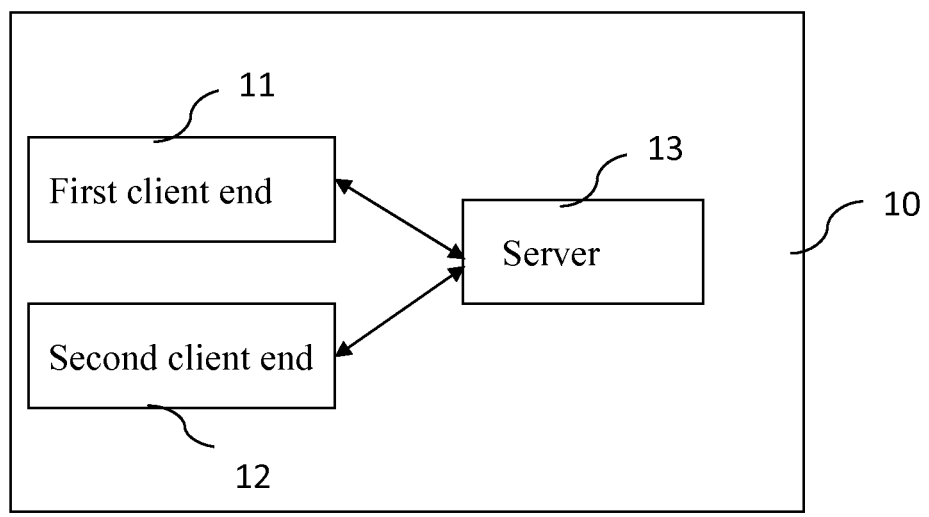
FIG. 1 is a structure schematic diagram of the system for synchronizing application programs across devices of the present disclosure.

FIG. 1 is a structure schematic diagram of a system for synchronizing application programs across devices of the present disclosure. As shown in FIG. 1, the system 10 for synchronizing application programs across devices comprises a first client end 11, a second client end 12 and a server 13.

The first client end 11 collects information of application programs installed in a first device and sends the information to the server 13. The second client end 12 collects device information of a second device and sends the device information to the server 13. The server 13 sends download addresses of the application programs compatible with the second device to the second client end 12 according to the received device information and the received information of the application programs. The second client end 12 downloads the application programs according to the download addresses and installs the application programs in the second device.

In particular, the information of the application programs in the present disclosure refers to software names, software types, software versions, application scenes, application fields and the like, but really not the application programs themselves. That is, the first client end 11 uploads relevant information of the application programs to the server instead of uploading the application programs to the server 13. The device information comprises mainboard parameters, internal memory parameters, display card parameters, CPU parameters (number of cores, dominant frequency, cache interface and the like), operating system environment and the like.

According to one embodiment of the present disclosure, the first client end 11 is preset or installed in the first device, and the user may log in the first client end 11 through a registered account. The first client end 11 logs in the server 13 through the account. The server 13 verifies information of the account and responds to the first client end 11 that the login is successful. The first client end 11 collects the information of the application programs installed in the first device and sends the information to the server 13. The server 13 receives the information of these application programs and associates the received information of the application programs with the account, and responds to the first client end 11 that the application programs are successfully synchronized.

It should be noted that, for different system platforms, approaches for collecting the information of the installed application programs are different, and any conventional approaches can be adopted for collecting the information of the installed application programs in the first device, and there is no need to repeat here.

The second client end 12 is preset or installed in the second device, and the user may log in the second client end 12 through the same account. The second client end 12 logs in the server 13 through the account. The server 13 verifies the information of the account, and responds to the second client end 12 that the login is successful. The second client end 12 collects device information on the second device and transmits the device information to the server 13. The device information of the second device may be collected by adopting any conventional approaches, and there is no need to repeat here. The server 13 pre-stores correspondence lists of the devices and the application programs compatible therewith according to device compatible information provided by an application program provider. The server 13 searches the information of the application programs compatible with the second device under the account according to the device information, and sends download addresses of the application programs compatible with the second device to the second client end 12. The second client end 12 downloads the application programs according to the download addresses and installs the application programs in the second device.

In the present embodiment, the account used by the first client end 11, the second client end 12 and the server 13 is the same registered account.

In other embodiments, in view of the problem regarding the security of user account information, connection among the first client end 11, the second client end 12 and the server 13 may be encrypted.

Figure 2:
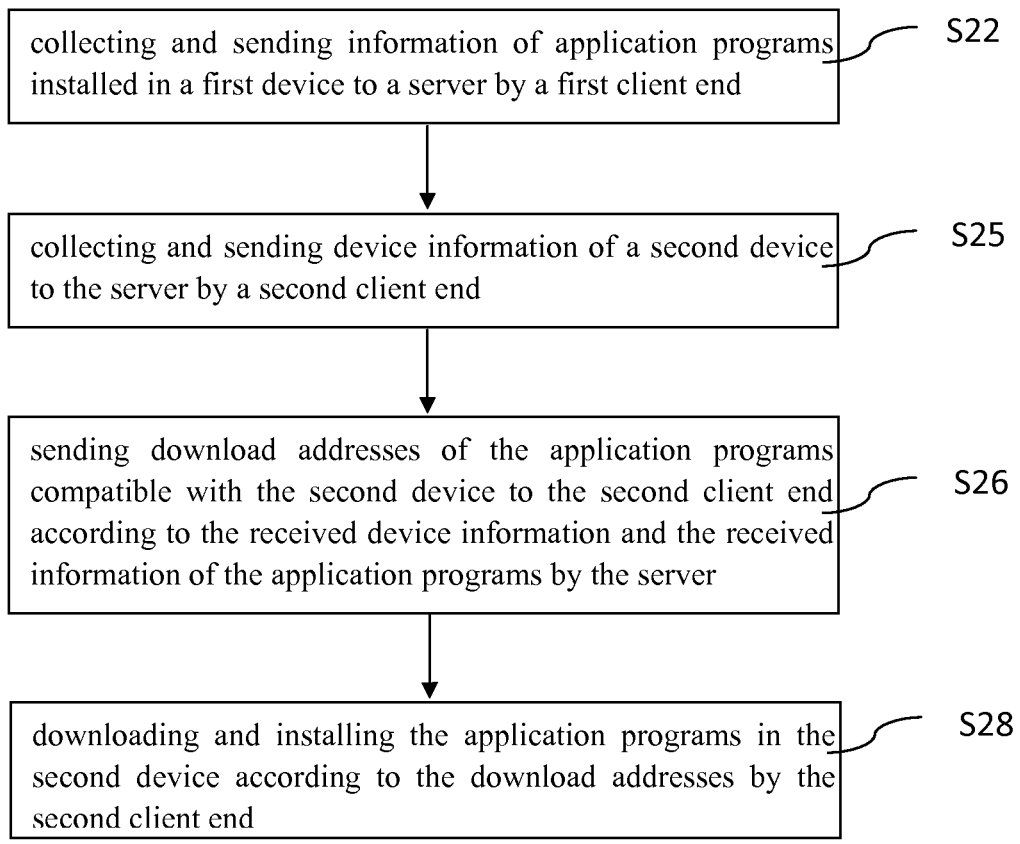
FIG. 2 is a flow schematic diagram of the method for synchronizing application programs across devices of the present disclosure.

FIG. 2 is a flow schematic diagram of a method for synchronizing application programs across devices of the present disclosure. As shown in FIG. 2, the method for synchronizing application programs across devices of the present disclosure comprises the following steps:

S22: collecting information of application information installed in a first device and sending the information to the server 13 by the first client end 11;

S25: collecting device information of a second device and sending the device information to the server 13 by the second client end 12;

S26: sending download addresses of the application programs compatible with the second device to the second client end 12 according to the received device information and the received information of the application programs by the server 13;

S28: downloading the application programs according to the download addresses and installing the application programs in the second device by the second client end 12.

Figure 3:
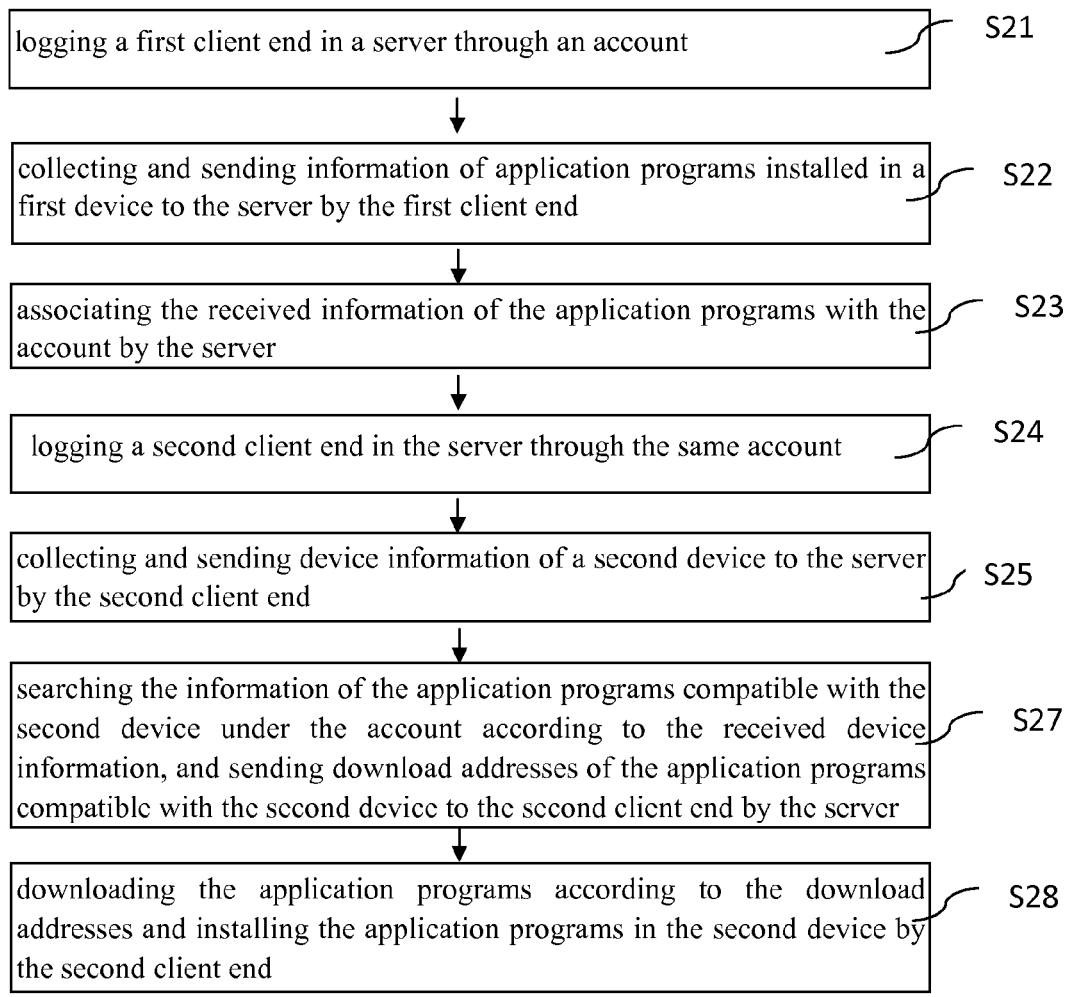
FIG. 3 is a flow schematic diagram of one specific embodiment of the method for synchronizing application programs across devices of the present disclosure.

Referring to FIG. 3, according to one specific embodiment of the present disclosure, the method for synchronizing application programs across devices comprises the following steps:

S21: logging the first client end 11 in the server 13 through an account;

S22: collecting information of application programs installed in a first device and sending the information to the server 13 by the first client end 11;

S23: associating the received information of the application programs with the account by the server 13;

S24: logging the second client end 12 in the server 13 through the same account;

S25: collecting device information of the second device and sending the device information to the server 13 by the second client end 12;

S27: searching the information of the application programs compatible with the second device under the account according to the received device information, and sending download addresses of the application programs compatible with the second device to the second client end 12 by the server 13;

S28: downloading the application programs according to the download addresses and installing the application programs in the second device by the second client end 12.

According to the abovementioned method, the user logs in a client end by using the account on the original device, and uploads information of application programs of the original device to the server; the user logs in another client end by using the same account on another up-to-date device, and sends device information of the up-to-date device to the server, the server sends download addresses of the application programs compatible with the up-to-date device according to the received device information and the received information of the application programs to the client end of the up-to-date device, and the client end of the up-to-date device downloads the application programs according to the download addresses and installs the application programs in the up-to-date device. Therefore, the method and system for synchronizing the application programs across the devices of the present disclosure are capable of conveniently and rapidly synchronizing the application programs among different devices to ensure that the user can rapidly and effectively install the application programs compatible with the up-to-date device, which have been installed in the original device.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for synchronizing application programs across devices, comprising the following steps of:
    installing a first client end in a first device, logging the first client end in a server through an account, and collecting and sending information of application programs installed in the first device to the server by the first client end, wherein the information of the application programs is just information relevant to the application programs instead of the application program themselves;
    associating the information of the application programs received from the first client end with the account by the server;
    installing a second client end in a second device, logging the second client end in the server through the same account, and collecting and sending device information of the second device to the server by the second client end, wherein the device information comprises mainboard parameters, internal memory parameters, display card parameters, Central Processing Unit (CPU) parameters or operating system environment;
    sending download addresses of the application programs compatible with the second device to the second client end according to the device information received from the second client end and the information of the application programs under the account by the server, wherein the step of sending download addresses comprises a step of searching the information of the application programs compatible with the second device under the account according to the received device information, and sending the download addresses of the application programs compatible with the second device to the second client end by the server;
    downloading and installing the application programs in the second device according to the download addresses by the second client end.

2. The method for synchronizing application programs across devices of claim 1, wherein the information of the application programs comprises software names, software types, software versions, application scenes or application fields.

3. A system for synchronizing application programs across devices, comprising a first client end, a second client end and a server, wherein:

the first client end is configured to collect and send information of application programs installed in a first device to the server, wherein the information of the application programs is just information relevant to the application programs instead of the application program themselves;

the second client end is configured to collect and send device information of a second device to the server, wherein the device information comprises mainboard parameters, internal memory parameters, display card parameters, CPU parameters or operating system environment;

the server comprises a memory storing executable instructions, the server is configured to send download addresses of the application programs compatible with the second device to the second client end according to the device information received from the second client end and the information of the application programs received from the first client end;

the second client end is further configured to download and install the application programs in the second device according to the download addresses;

the first client end is further configured to log in the server through an account;

the server is further configured to associate the received information of the application programs with the account;

the second client end is further configured to log in the server through the same account; and the server is further configured to search the information of the application programs compatible with the second device according to the device information, and send the download addresses of the application programs compatible with the second device to the second client end.

4. The system for synchronizing application programs across devices of claim 3, wherein the information of the application programs comprises software names, software types, software versions, application scenes or application fields.

* * * * *